July 15, 1924.  1,501,861
F. MEAD ET AL
RAILROAD CUSHION WHEEL
Filed July 5, 1922  2 Sheets-Sheet 1
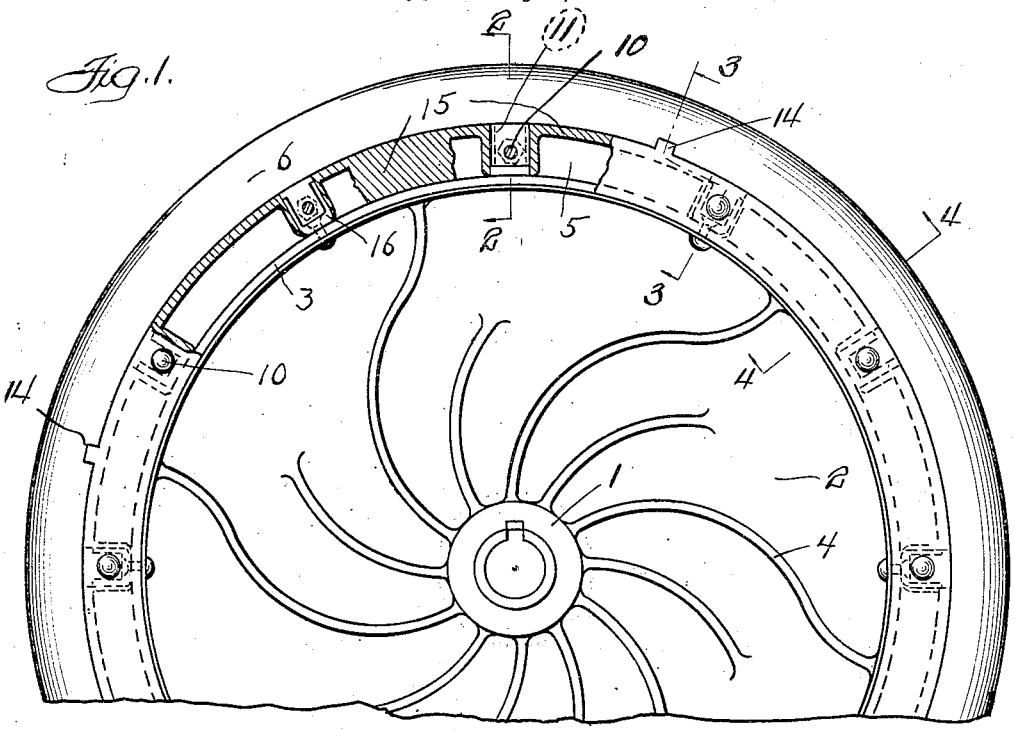
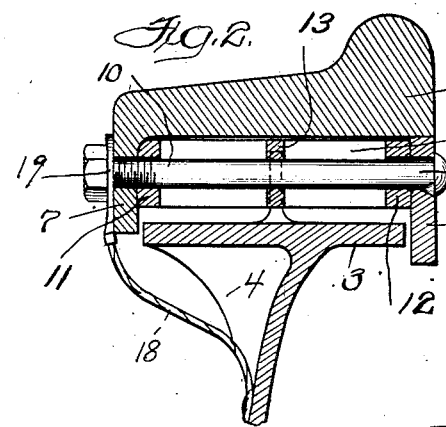
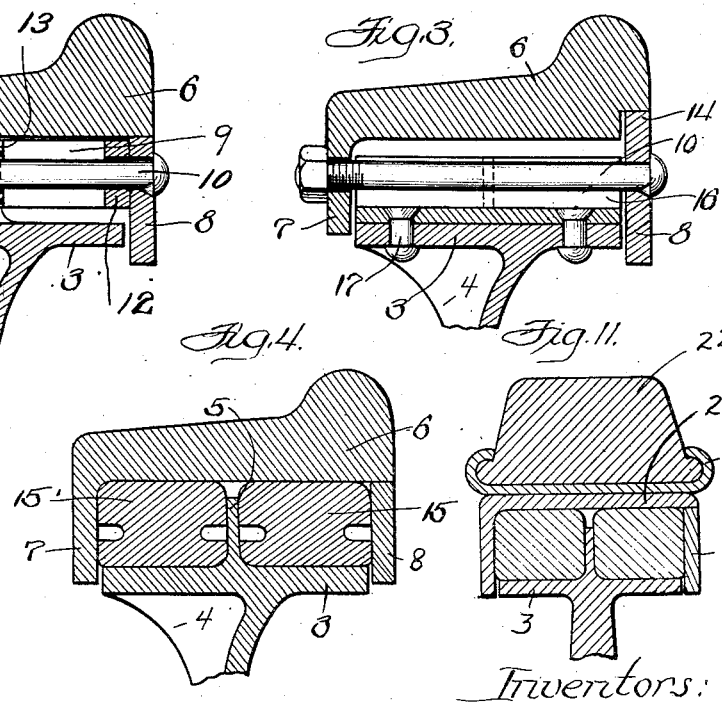
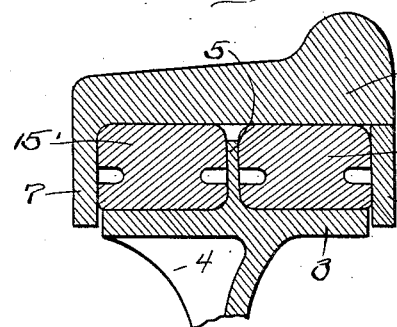
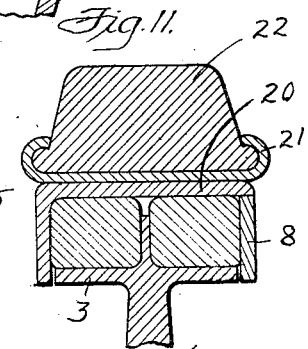
Witness:
W. K. Olson
Inventors:
Francis Mead and Charles O. Guernsey
by Albert Scheible, Atty.

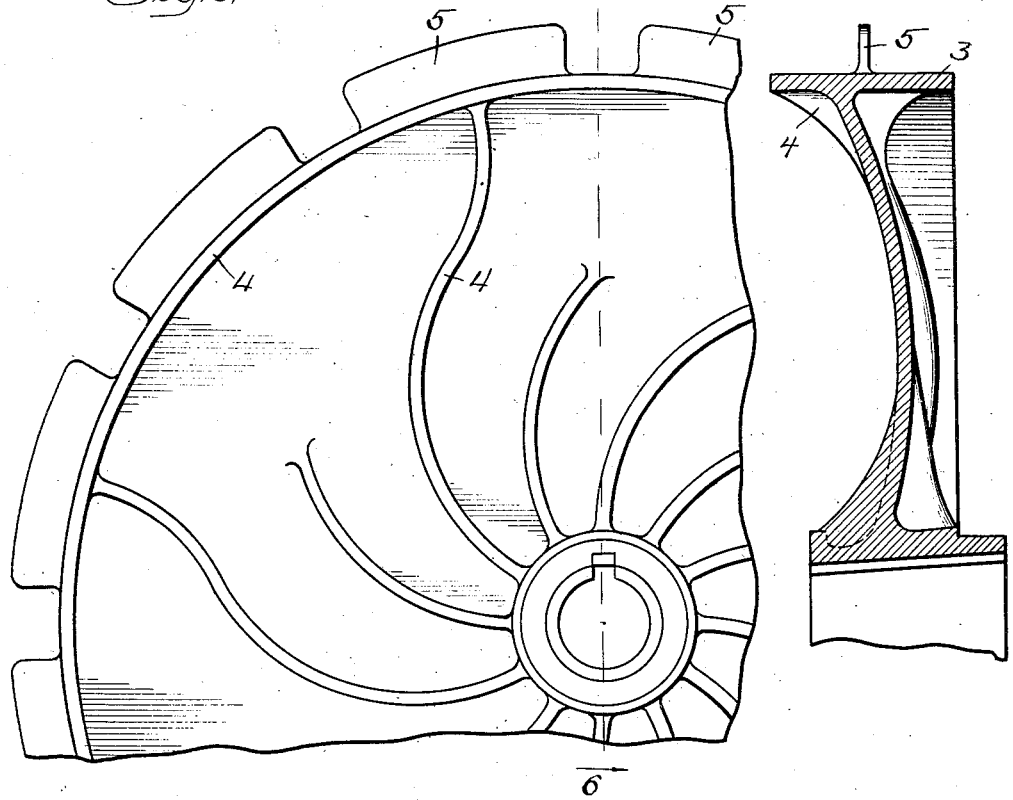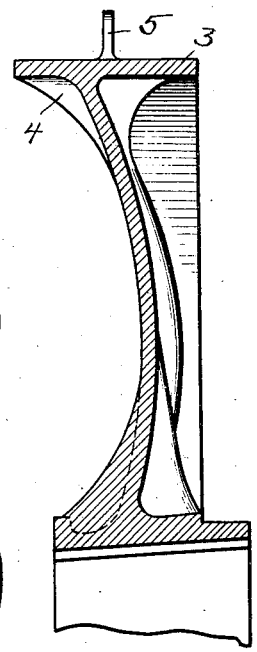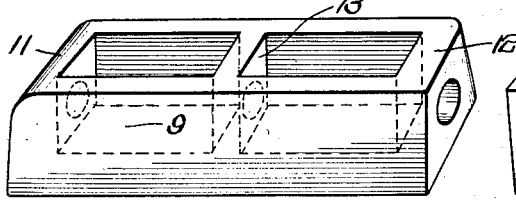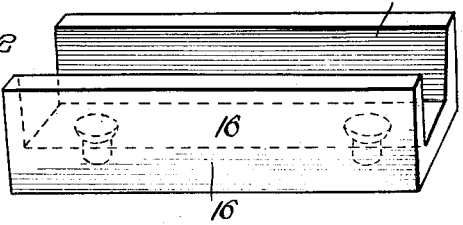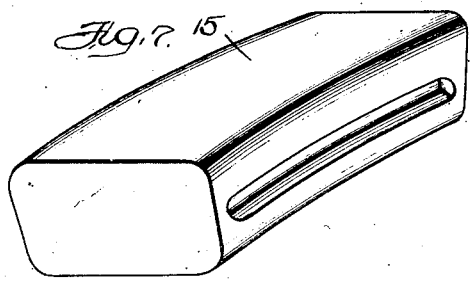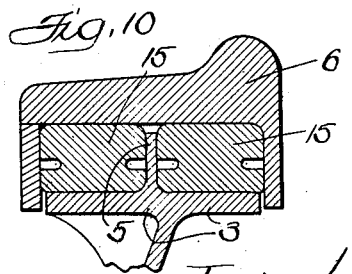

Patented July 15, 1924.

1,501,861

UNITED STATES PATENT OFFICE.

FRANCIS MEAD, OF CHICAGO, ILLINOIS, AND CHARLES O. GUERNSEY, OF WABASH, INDIANA.

RAILROAD CUSHION WHEEL.

Application filed July 5, 1922. Serial No. 573,015.

*To all whom it may concern:*

Be it known that we, FRANCIS MEAD, residing at Chicago, Illinois, and CHARLES O. GUERNSEY, residing at Wabash, Indiana, both citizens of the United States, have invented certain new and useful Improvements in Railroad Cushion Wheels; and we do hereby declare the following to be a full, clear, and exact description of the invention, such as will enable others skilled in the art to which it appertains to make and use the same.

Our invention relates to inner-cushioned wheels and in certain of its general aspects aims to provide a wheel construction particularly suited for use on railway cars. In this aspect, it aims to provide a construction which will readily permit a highly effective arrangement of cushions to be operatively interposed between a central or hub member of an approximately standard type and an outer tread rim corresponding in its outward bearing portions to the standard tread of railroad car wheels, which will permit an inspection of the cushions without disassembling the wheel or even removing it from the car, and which will afford a good electrical connection between the hub and the tread of the wheel although employing cushions of insulating material.

Viewed in this general aspect, our invention aims to provide a wheel construction particularly adapted for use on railroad cars and embodying the underlying features disclosed in two previously issued Letters Patent of the United States to Francis Mead, namely Patent No. 1195379 of August 22, 1916 on a resilient wheel, and Patent No. 1401421 of December 27, 1921 on an innercushioned wheel. The first named of the above patents to one of the present applicants discloses a cushion wheel construction in which the cushioning is effected by two sets of cushions disposed in ring formation at opposite sides of a medial flange on one of the rim parts, each laterally adjacent pair of cushions bearing at their ends against a pair of driving dogs secured respectively to the two rim members between which the cushions are interposed radially of the wheel. In this patent, various arrangements are shown for limiting the relative lateral movement of the two rim portions and in the later Patent No. 1401421, this movement is restricted by side flanges respectively integral with two halves of a channel-shaped member forming a part of the outer rim member, these side flanges being rigidly spaced apart by certain of the driving dogs which are secured for that purpose both to the side flanges and the peripheral portion of the said channel-sectioned rim.

While the construction thus mentioned has proven highly practical for use on both autotrucks and other automobiles in which the channel-sectioned rim has an auxiliary tirecarrying rim shrunk upon it, the strains occurring in railroad practice make a similar construction undesirable, as an auxiliary tire rim would be apt to slide back and forth upon the outer channel-sectioned rim which substantially houses the cushions. To meet this as well as other conditions encountered in railroad practice, our invention aims to provide an outer rim member which will include a tread rim having one lateral flange integral with the same; aims to provide a separate and detachable side flange at the opposite side of the wheel, and aims to equip this flange with means for interlocking it with the said tread rim against rotation. It also aims to simplify the assembling of the said rim parts by employing bolts extending transversely of the wheel for securing the detachable side flange in operative position, and aims to utilize certain of these bolts for supporting the alternate driving dogs which are carried by the outer rim member and which space the detachable flange from the integral flange. Furthermore, our invention aims to shape the companion driving dogs secured to the inner wheel member for housing the main portions of the other bolts with sufficient clearance to permit some relative circumferential and radial movement of the inner and outer wheel members; aims to provide the driving dogs with cushion-engaging portions disposed in the planes in which they will be most effective; and aims to shape the medial web on the inner rim member so that the same will be highly effective for spacing the two annularly arranged sets of cushions while permitting ample room for the said driving dogs and bolts.

Furthermore, good practice demands that means should be provided for inspecting the condition of the cushions without taking the wheels apart and without even jacking up the car or removing the wheels. Hence our invention also provides a construction in which one of the two sets of cushions on each wheel can be inspected by removing a readily detachable flange, and in which this inspection can be made while the wheel is sustaining its normal load.

In still another aspect, our invention aims to provide the needed electrical connection between the outer and inner wheel members in spite of the insulation afforded by the cushions, so that such wheels can be effectively employed in connection with block signal systems or the like where a signaling current is to be carried through the wheel from the rail to the shaft of the car. For this purpose, our invention aims to provide simple, easily installed and effective means for electrically connecting the two rim members while permitting such a relative movement of these rim members as is required for a proper cushioning action of the wheel, and desirably aims to employ one or more of the aforesaid bolts as means for securing the wire or equivalent connection to the outer rim member. Still further and also more detailed objects will appear from the following specification and from the accompanying drawings, in which—

Fig. 1 is a fragmentary elevation of a wheel embodying our invention, taken from the right hand side of Fig. 2 and with a portion of the detachable side flange broken away to show the arrangement of the parts.

Fig. 2 is an enlarged, fragmentary and transverse section through the upper portion of the wheel of Fig. 1, taken along the line 2—2.

Fig. 3 is a similar section taken along the line 3—3 and showing one of the keys which interlock the detachable flange with the outer rim member.

Fig. 4 is a similar section taken along the line 4—4 through the rim portions of the wheel intermediate of the driving dogs.

Fig. 5 is a fragmentary side elevation of the inner or hub member of the wheel.

Fig. 6 is a central and transverse section through the same, taken along the correspondingly numbered line in Fig. 5.

Fig. 7 is an enlarged perspective view of one of the cushions employed in the wheel of Figs. 1 to 4 inclusive.

Fig. 8 is a perspective view of one of the driving dogs secured to the outer or threaded rim member of the wheel.

Fig. 9 is a similar perspective view of one of the driving dogs secured to the inner or hub member of the wheel.

Fig. 10 is a fragmentary transverse section of the outer rim member of another embodiment of our invention, namely one in which the integral side flange is on the same side of the wheel with the circumferential flange on the tread.

Fig. 11 is a similar transverse section through an embodiment of our invention designed for highway use and employing a detachable tread rim.

In the embodiments of Figs. 1 to 9 inclusive, the wheel of our invention includes an inner or hub member comprising in integral formation the hub 1 connected by the web 2 to an inner rim 3, the web 2 being stiffened by a plurality of webs 4 which desirably are symmetrically disposed about the axis of the wheel. The rim 3 of the said hub or inner rim member has an intermittently interrupted medial web 5 extending substantially in the medial plane of the wheel outwardly from the said rim, this rim being otherwise cylindrical in its peripheral surface. The gaps which divide the outwardly extending web 5 into sections are desirably spaced uniformly around the circumference of the rim 4, and all of the said web sections 5 are desirably of the same height radially of the wheel, namely a height less than the thickness of the cushions which afford the resiliency for the wheel.

For the outer rim member of the wheel we desirably employ a tread rim 6 having a bore of larger diameter than the periphery of the web and having a pair of side flanges extending inwardly therefrom. These side flanges are spaced from each other laterally of the wheel by a greater distance than the width of the inner rim 3, and one of these flanges, such as the flange 7 in Figs. 2 to 4 inclusive, is desirably integral with the tread rim 6. The companion flange 8 at the opposite side of the rim desirably has a periphery slidably fitting into the bore of the tread rim 6 so that this interfitting will hold the flange 8 against movement radially of this tread rim. To hold this detachable flange properly spaced from the companion flange 7, we interpose spacer members 9 which extend through the alternate gaps in the web 5 on the inner rim member of the wheel and which are supported by bolts 10 extending through the same gaps parallel to the axis of the wheel. Each of these spacer members 9 is desirably in the form of a frame comprising a pair of ends 11 and 12 having their oppositely directed faces spaced by a distance corresponding to the desired spacing between the opposed faces of the flanges 7 and 8, and having a pair of longer sides connecting these two ends. The frame thus constructed also desirably has a central stiffening partition 13 disposed between its said longer sides, this partition as well as the ends 11 and 12 all having alined perforations for slidably receiving one of the supporting bolts 10. When the spacer member as thus constructed after the manner of Fig. 8 is slipped into position, it will be obvious from Fig. 2 that this spacer member holds the flanges 7 and 8 rigidly spaced, while the bolt 10 clamps these parts tightly to each other, thus affording a firm assembly of the said parts. As an added precaution against possible relative rotational movement of the tread rim and the side flange 8, we may also provide this flange with teeth or keys 14 projecting radially outwardly thereof and each socketed in a corresponding notch or recess in the tread rim member after the manner shown in Figs. 1 and 3.

Besides acting as spacer members for the side flanges of the outer rim member, the frame members 9 also serve as one of two sets of driving dogs for engaging the ends of cushions 15 which are disposed in two -ing formations respectively at opposite sides of the medial web sections 5 of the inner rim member and which are interposed between the inner rim 3 and the bore of the tread rim 6. The other driving dogs 16 which alternate circumferentially of the wheel with the said spacer members 9 are secured to the inner rim member and are here shown consisting of channels corresponding in length to the width of the inner rim 3, each of these channels havings its base secured to the inner rim by rivets 17 after the manner shown in Fig. 3. Each of the channels has its webs separated by a considerably greater distance than the diameter of one of the bolts 10 employed for securing the two side flanges of the outer rim member to each other, so as to permit such relative rotational movement of the two rim members as occurs when the wheel is in use owing to the longitudinal compression of the cushions when the vehicle is started from rest in either direction.

Each of the cushion sections 15 is of such a width that when the wheel is assembled, the sides of this cushion will respectively engage one of the side flanges of the outer rim and an adjacent medial web portion 5 after the manner of Fig. 4. Moreover, each of these cushion sections 15 is of such a length that it will bear at one end against one of the spacer members 9 and at its other end against one of the channels; or in other words, so that it will be opposed circumferentially of the wheel between driving dogs secured alternately to the inner and outer rim members. To make this thrust or torque transmitting engagement between the driving dogs and the cushion sections most effective, we desirably incline the opposite sides of each driving dog toward each other so that the outward or cushion engaging sides of each driving dog are in planes radial of the wheel, thereby causing the driving thrust to be effectively imparted through the entire cushions.

With the construction and arrangement as above described, it will be evident that the integral medial flange on the inner rim member forms an effective member for resisting side thrust on the inner wheel member, while the integral side flange on the tread rim together with the rigidly secured detachable flange act similarly on the outer rim. Moreover, by practically inserting the two series of cushions into the tread rim we introduce these cushions where they will permit each cushion to be of an ample length for securing a highly effective action. At the same time, the simplicity of our construction allows the cost to be kept quite moderate and the entire arrangement is such as will present a handsome appearance.

Where such wheels are to be used on railroads using signaling devices or other electrical apparatus for which electrical connections must be made from the rails through the wheels, or on trolley cars, the high insulating quality of the rubber which is desirably used for the cushions would interfere with such a grounding of the wheel as a whole to the rail. To overcome this limitation we desirably provide means for electrically connecting the inner and outer wheel members and preferably do so by providing a flexible conductor connecting the integral tread rim flange 7 with some portion of the hub member, such as one of the stiffening webs 4. To permit of such an electrical connection without interfering with the ready removal and replacing of the tread rim in case this wears flat and needs to be resurfaced, we desirably fasten the needed connector, such as the flexible cable 18 of Fig. 2, only to the inner rim member, as for example by welding it to one of the webs 4. Then we provide the free end of this connector with a metal eye 19 which is clamped between one of the side flanges on the tread rim by the nut on one of the bolts 10 which secure the detachable flange 8 to this tread rim, so that this bolt also serves the added purpose of securing the insulation-bridging electrical connector to the tread rim.

Of course, it will be understood that the shapes, materials and details of construction of the various parts may be varied in many ways without departing from the spirit of our invention, so that we do not wish to be limited to the same, although we have found it highly advantageous to employ the features heretofore illustrated and described, including the stiffening partition 13 in each driving dog of one set (which enables us to secure adequate strength in this driving dog while using relatively light side walls), the lateral recesses in the cushions (which increase the resiliency while permitting the use of a grade of rubber adapted to sustain a heavy loading), and the casting of the integral side flange 7 at the opposite edge of the tread rim from the outwardly projecting flange on the latter. For example, Fig. 10 shows a construction in which this integral side flange is on the same side of the tread rim with the flange which engages one side of the rail.

Nor do we wish to be limited in the use of our invention to railway wheels in which the outer cushion-engaging rim has a flanged tread formation integral with it, as many of the above disclosed features might obviously be employed also on auto-trucks or other vehicles designed for highway use. Thus Fig. 11 shows an embodiment in which the outer rim member 20 corresponds to a standard S. A. E. band as standardized by the society of automotive engineers and in which a clincher rim 21 carrying a solid rubber tire 22 is forced upon this member 20.

We claim as our invention:—

1. A cushioned wheel comprising a hub member having a cylindrical periphery and a web extending beyond the said periphery substantially in the medial plane of the hub member, the web having gaps therein, pairs of cushions respectively disposed at opposite sides of the sections into which the web is divided by the gaps, each cushion projecting laterally beyond the adjacent peripheral portion of the hub member and projecting radially of the wheel beyond the adjacent web section; an outer rim member having a bore engaging all of the said cushions and having lateral flanges respectively engaging the laterally outward cushion sides; and driving dogs extending transversely of the wheel through the gaps in the web and alternately secured to the hub member and to the outer rim member.

2. In a cushioned wheel, cushions disposed in two annular formations between two rims one of which has a web spacing the two cushion formations while the other has an integral flange engaging the laterally outer face of one cushion formation, a second flange engaging the laterally outer face of the other cushion formation, the second flange and the first named rim having interengaging formations to prevent relative rotational movement thereof, and means for detachably holding the second flange in its said cushion engaging position.

3. In a cushioned wheel, cushions disposed in two annular formations between two rims one of which has a web spacing the two cushion formations while the other has an integral flange engaging the laterally outer face of one cushion formation, a second flange engaging the laterally outer face of the other cushion formation, bolts extending transversely of the wheel and connecting the two flanges, and cushion engaging driving dogs alternately carried by the two rims, the driving dogs carried by the flange-equipped rim being supported by certain of the said bolts.

4. In a cushioned wheel, cushions disposed in two annular formations between two rims one of which has a web spacing the two cushion formations while the other has an integral flange engaging the laterally outer face of one cushion formation, a second flange engaging the laterally outer face of the other cushion formation, cushion engaging driving dogs alternately carried by the two rims, the driving dogs carried by the flange-equipped rim being disposed for rigidly spacing the two flanges, and bolts extending through the last named driving dogs and connecting the two flanges.

5. In a cushioned wheel, cushions disposed in two annular formations between the two rims one of which has a web spacing the two cushion formations while the other has an integral flange engaging the laterally outer face of one cushion formation, a second flange engaging the laterally outer face of the other cushion formation, cushion engaging driving dogs alternately carried by the two rims, the driving dogs carried by the web-equipped rim each having a pair of spaced cushion engaging walls, and bolts connecting the two flanges and each extending freely between the said walls of one of the last named driving dogs.

6. In a resilient wheel having cushions disposed in annular formations between inner and outer rims, and having one of the said rims equipped with lateral flanges drawn toward each other by bolts, driving dogs secured to the last named rim and disposed between certain consecutive cushions, each of the said driving dogs having cushion-engaging walls spaced from each other to permit one of the bolts to extend between the said walls.

7. In a resilient wheel having cushions disposed in annular formation between inner and outer rims, and having one of the said rims equipped with lateral flanges drawn toward each other by bolts, driving dogs secured to the last named rim and disposed between certain consecutive cushions; each of the said driving dogs having cushion-engaging walls spaced from each other to permit one of the bolts to extend between the said walls, and having its ends respectively engaging the said flanges to space the same.

8. In a resilient wheel having cushions disposed in annular formation between inner and outer rims, and having one of the said rims equipped with lateral flanges drawn toward each other by bolts, driving dogs secured to one of the said rims and disposed between certain consecutive cushions, each of the said driving dogs having cushion-engaging walls extending radially outward of the wheel and spaced from each other to permit one of the bolts to extend between the said walls, and having end walls respectively engaging the said flanges to space the same, the said end walls being equipped with perforations through which the said bolt extends.

9. A combined driving dog and rim flange spacer for an inner-cushioned wheel of the class described, comprising a metal frame having its ends respectively engaging two opposite rim flanges and having a pair of cushion-engaging sides diverging from each other so as to present their outer faces substantially in planes radial of the wheel, and having webs extending transversely of the said sides and perforated for the extension through the same of a bolt securing the rim flanges to each other.

10. A combined driving dog and flange spacer for an inner-cushioned wheel having inner and outer rim members one of which carries a pair of flanges laterally overhanging the other, comprising a metal frame having two opposite sides disposed for engaging cushions between which the frame is disposed, the said sides extending from one rim flange to the other, the frame having means transverse of the said sides for rigidly spacing the said sides and for supporting the frame on one of the bolts which connect the said rim flanges.

11. An inner-cushioned wheel as per claim 3, in combination with a flexible conductor secured at one end to the said integral flange upon one of the wheel members and at its other end to the other wheel member.

12. An inner-cushioned wheel as per claim 4, in combination with a flexible conductor secured at one end to the rim equipped with the said web and secured to the other rim by one of the said bolts.

13. An inner cushioned wheel for railroad use comprising an outer rim having at one side an integral tread flange and having at its other side an integral inwardly extending flange, a second inwardly extending flange detachably secured to the first named side of the outer rim, an inner rim member concentric with the outer rim, and a cushioning means spacing the outer rim from the inner rim radially of the wheel and spacing the inner rim laterally of the wheel from both of the said flanges.

14. In a cushioned wheel, an inner rim member having a web projecting beyond its peripheral face, cushions disposed in annular formations at opposite sides of the said web, an outer rim member bearing against the periphery of the cushions and having an integral side flange extending along one side of the cushions, a companion side flange at the other side of the cushions, and fastening members connecting the two side flanges.

15. In a cushioned wheel, cushions disposed in two annular formations between two rims one of which has a web spacing the two cushion formations while the other has side flanges each engaging the outer face of one cushion formation, one of the side flanges being integral with and the other detachable from the rim carrying the same, driving dogs alternately carried by the two rims, certain of the driving dogs being disposed for spacing the said side flanges, and means for clamping the side flanges against the last named driving dogs.

Signed at Chicago, Illinois, June 30th, 1922.

FRANCIS MEAD.
CHARLES O. GUERNSEY.